UNITED STATES PATENT OFFICE.

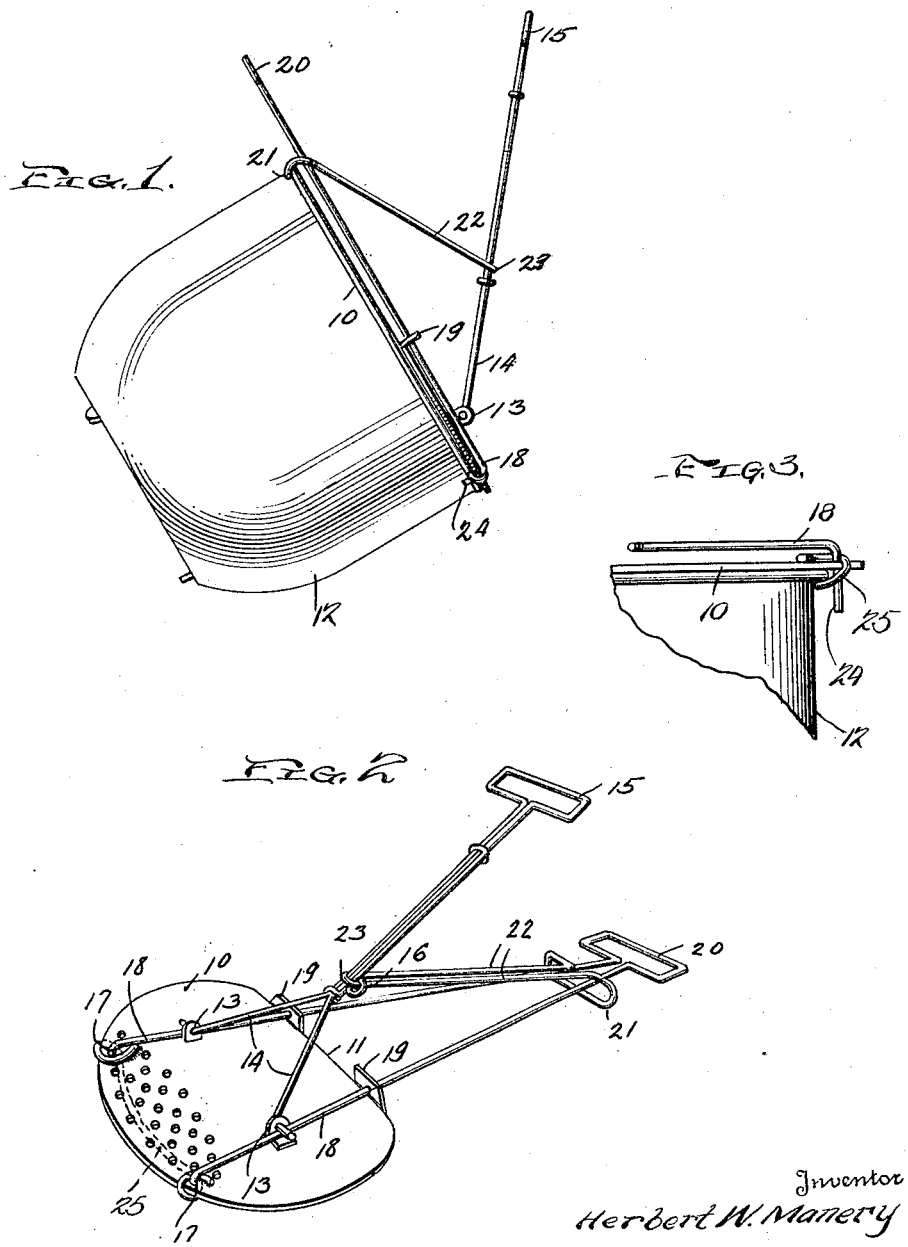

HERBERT W. MANERY, OF RAY, MINNESOTA.

SELF-ADJUSTABLE STRAINER.

1,402,170.   Specification of Letters Patent.   Patented Jan. 3, 1922.

Application filed October 15, 1919. Serial No. 330,915.

*To all whom it may concern:*

Be it known that I, HERBERT W. MANERY, a citizen of the United States, residing at Ray, in the county of Koochiching, State of Minnesota, have invented certain new and useful Improvements in Self-Adjustable Strainers; and I do hereby declare the following to be a full, clear, and exact description of the invention, such as will enable others skilled in the art to which it appertains to make and use the same.

This invention relates to new and useful improvements in straining devices and particularly to devices used for tilting large vessels while pouring liquids therefrom.

On object of the present invention is to provide a novel and improved device of this character by means of which the mouth of a vessel of any diameter within certain limits can be grasped and the vessel tilted so that the liquid can pour therefrom and the solids remain in the vessel.

Another object is to provide a novel and improved device of this character by means of which the weight of the vessel tends to increase the gripping action so that slipping is prevented.

Other objects and advantages will be apparent from the following description when taken in connection with the accompanying drawing.

In the drawing:

Figure 1 is a side elevation of a cooking vessel in tilted position, showing the invention applied thereto.

Figure 2 is a perspective view of the device removed from the vessel.

Figure 3 is an enlarged fragmentary side elevation of a portion of the device and vessel, showing the outer gripping member 25.

Referring particularly to the accompanying drawing, 10 represents a metal plate having one edge formed on a straight line, as at 11 while the other edge is arcuate for the purpose of conforming to a portion of the peripheral edge of the vessel 12, said plate being placed on the mouth of the vessel adjacent one side thereof so that when the vessel is tilted the contents will fall toward the plate, as will be readily understood.

On the upper face of the plate there are secured the spaced apertured ears 13 which receive the outturned ends of the legs of the bail 14, said bail being formed from heavy wire and having the handle loop 15 on its outer end. Carried by the stem of the bail, adjacent its pivotal end, is a laterally directed eye 16, the purpose of which will presently appear. Adjacent the curved edge of the plate are two openings 17 in which are secured the outer ends of the legs 18, said legs extending rearwardly through apertured lugs 19 formed on the straight edge of the plate and being connected by a curved loop portion 20 which serves as a handle which is grasped in the left hand of the user. It will be noted that these legs diverge toward their outer ends, or where they are secured in the plate 10. Slidably engaged on and embracing these legs is an elongated loop 21 the ends of which are extended upwardly to form the legs 22, and which legs are connected by a curved portion 23 after passing on the outer sides of the legs of the handle. Disposed in spaced relation below the outer or front curved edge of the plate 10, and slightly in rear thereof, is a curved wire 25, the ends of which extend obliquely upward across the said edge of the plate, and curved to extend beneath the legs 18, where they are secured to the upper face of the plate. One of the legs 22 is disposed for slidable movement through the before-mentioned eye 16, and when the device is manipulated to engage the depending member 25, which is disposed below the plate, and the elongated loop 21, with the opposite sides of the mouth of the vessel, said eye will engage with the curved portion 23 and pull the member comprising the legs 22 and loop 21 toward the plate.

In the operation of the device the loop 21 and the member 25 are engaged with the opposite sides of the mouth of the vessel with the plate 10 resting on the edge of the mouth at one side thereof. The handle 15 is moved upwardly and grasped in the right hand of the operator while the left hand of the operator grasps the loop 20 at the outer ends of the legs 18. The vessel can then be easily tilted to pour the liquid from the same, the plate preventing the solids from escaping while the openings of the plate permit the liquid to readily flow out.

By reason of the fact that the parts are readily slidable with respect to each other the adjustment to different vessels is easily accomplished.

What is claimed is:

1. A straining device and vessel lifter comprising a perforated plate arranged for disposition on the mouth of the vessel, a stationary handle carried by the plate, a vessel gripping means stationarily carried by the plate and disposed below and inwardly of one edge thereof, a movable handle member carried by the plate, and a vessel gripping means slidably engaged with the stationary and movable handle members, and movable toward and away from the opposite edge of the plate.

2. A straining device and vessel lifter comprising a perforated plate, a stationary handle on the plate, a pivoted handle carried by the plate, a member slidably connected with the pivoted handle, and having a vessel engaging portion slidably engaged with the first handle, and a curved wire member for engagement with the mouth of the vessel and disposed in spaced relation to one face of the plate adjacent the perforated portion thereof and having its ends extended transversely of the adjacent edge of the plate and secured to the other face of the plate.

In testimony whereof, I affix my signature, in the presence of two witnesses.

HERBERT W. MANERY.

Witnesses:
M. HANSEN,
THOMAS WATSON.